Nov. 18, 1952  J. L. BILLS ET AL  2,618,533
MANUFACTURE OF CARBON BLACK
Filed July 22, 1948
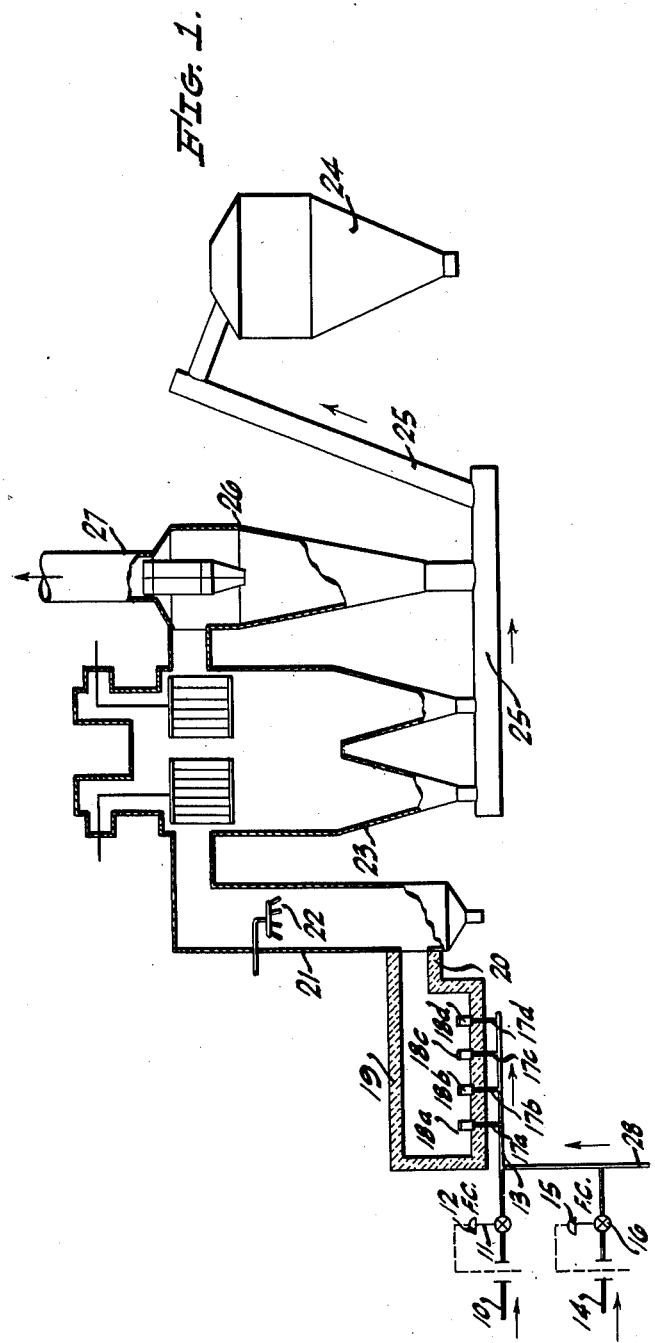
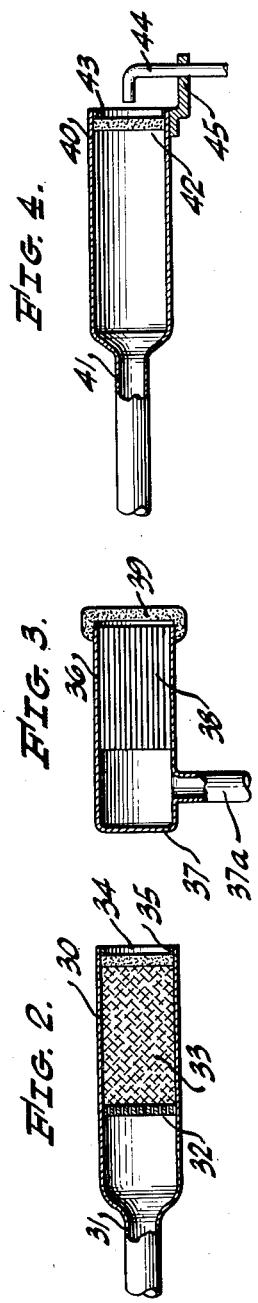
INVENTORS.
JOHN L. BILLS
ART C. McKINNIS.
BY Richard C. Hartman
ATTORNEY Patented Nov. 18, 1952

2,618,533

UNITED STATES PATENT OFFICE 2,618,533

MANUFACTURE OF CARBON BLACK

John L. Bills and Art C. McKinnis, Long Beach, Calif., assignors to Union Oil Company of California, Los Angeles, Calif., a corporation of California Application July 22, 1948, Serial No. 40,093

4 Claims. (Cl. 23—209.8)

This invention relates to the manufacture of carbon black, and in particular concerns a process for the preparation of carbon black of extremely small particle size.

Finely divided amorphous carbon, generally known as "carbon black," is employed in large quantities by the rubber industry for reinforcing and increasing the wear resistance of rubber products such as tires and other articles which are subjected to abrasive forces. Among the several specific properties desired in the carbon black employed for such purpose, that of extremely small particle size is considered to be one of the most important. Carbon black also finds wide use as a pigment in the manufacture of printing inks, paints and enamels, lacquers, polishes, plastic compositions, etc., and the special qualities desirable for such use, e. g., good color tone, high tinting power, covering ability, etc., are likewise closely related to the size of the individual particles of the carbon black. In general, it is highly desirable that pigment blacks be of even smaller particle size than the blacks used in rubber compounding.

Among the various processes for the production of carbon black, those in which the black is produced by the combustion or cracking of natural gas and like gaseous hydrocarbons in a furnace-type apparatus are gradually supplanting the older channel process by reason of their economy and greater ease of operation to produce a product of uniform quality. Such furnace processes, however, suffer from the disadvantage of producing carbon black products whose average particle size is usually at least several times greater than that of the carbon blacks produced by the channel or allied processes. Thus, the average particle diameter of furnace blacks ranges from about 40 to about 100 millimicrons, whereas a good channel black may have an average particle diameter of 20, or even as low as 10, millimicrons.

It is accordingly an object of the present invention to provide an improved furnace process for the production of carbon black.

A further object is to provide a carbon black process which realizes the inherent advantages of a furnace process and at the same time produces a carbon black product of particle size equal to or better than channel black.

A still further object is to provide an improved process for the production of carbon black having an average particle diameter of the nature of 10 to 20 millimicrons.

Other objects will be apparent from the following detailed description of the invention, and various advantages not specifically referred to as herein will occur to those skilled in the art upon employment of the invention in practice.

We have now found that the above and related objects may be realized in a process wherein natural gas or equivalent gaseous hydrocarbons, e. g., methane, ethane, ethylene, propane, butane, etc., or mixtures thereof, or vaporized normally liquid hydrocarbons such as benzene, gas oil, etc., are burned with a regulated quantity of oxygen or oxygen-containing gas in a closed combustion chamber or furnace in such manner that the gas mixture is divided into a multiplicity of high velocity fine streams prior to its combustion. More particularly we have found that by passing a combustible mixture of natural gas or equivalent gaseous hydrocarbons and oxygen or an oxygen-containing gas such as air through a porous wall or diaphragm into a closed chamber wherein said mixture undergoes combustion, there is formed a carbon black product of extremely small particle size. Examination of such product under the electron microscope reveals it to have an average particle size of about 10 millimicrons, which compares very favorably with that of the best high-color channel blacks obtainable. Such product is accordingly particularly well adapted for use as a high quality pigment and in rubber compounding where a high degree of wear resistance is desired. The electron microscope also reveals that the carbon black produced by the present process possesses the chain-like or network particle structure which is characteristic of acetylene blacks and which apparently endows the acetylene blacks with their characteristic special properties.

In the accompanying drawings:

Figure 1 represents a schematic flow diagram of a preferred embodiment of the process of the invention.

Figures 2, 3 and 4 represent cross sections of several different types of burners which may be employed in practice of the invention.

Referring now to Figure 1, natural gas is introduced from supply line 10 through valve 11 at a rate determined by flow controller 12 into burner supply manifold 13. Air is introduced into manifold 13 from supply line 14 at a rate determined by flow controller 15 operating valve 16. The mixture of air and natural gas passes through burner supply manifold 13 and burner supply lines 17a, 17b, 17c, and 17d to burners 18a, 18b, 18c, and 18d mounted in furnace 19. As is set forth in greater detail hereinafter, the burners are so constructed that the gas mixture passes through a porous wall or diaphragm before being ignited. Ignition of the gas mixture at the burner tips may be initiated by means of a spark plug, pilot burner, or other means, not shown. The products of the combustion, comprising carbon in extremely finely-divided form and gases such as unreacted natural gas, carbon dioxide, carbon monoxide, water vapor, acetylene, etc., accumulate within furnace 19 and pass through a flue 20 into a quenching tower 21 where they are rapidly cooled by a water spray 22. The cooled combustion products are then led through an electrical precipitator 23 where a substantial amount of the carbon black is separated from the gases and passed to storage bin 24 via conveyor system 25. The carbon black not recovered in the precipitator 23 is collected in a centrifugal separator 26 and passed to storage bin 24 via conveyor system 25. The vapor products leaving the separator 26 pass therefrom via duct 27 to a recovery system, not shown, where they may be processed as hereinafter more fully explained for the recovery of unreacted natural gas and by-product values.

It will be understood that the carbon black recovery system shown in Figure 1, comprising an electrical precipitator and centrifugal separator and associated conveyor system and storage bin, is described merely by way of example, and that any means of separating finely-divided solids from gases may be employed for recovering the carbon black product without departing from the principle of the invention. Thus, the precipitator and centrifugal separator may be replaced by a bag filter system, or such a system may be employed in conjunction with electrical precipitation and/or centrifugal separation. Other recovery means or combinations of means, particularly those previously found adapted to use in carbon black processes, may likewise be employed.

As hereinbefore mentioned, the formation of carbon black of extremely small particle size according to the present invention resides in the particular manner in which combustion of the gas mixture is effected, i. e., it is essential to the success of the process that the mixture be passed through a porous wall or diaphragm prior to its combustion. Attempts to secure a comparable carbon black product by substituting other means, e. g., a bundle of ceramic tubes of small diameter, for the porous diaphragm or wall have not been successful. A number of types of burner construction permit carrying out the combustion in the required manner, Figures 2, 3 and 4 of the accompanying drawing illustrating several operable types.

In Figure 2, the burner consists of a tubular body 30, one end of which is constricted to form a neck-portion 31 which serves as an inlet conduit for the combustible gas mixture. This body is preferably constructed of metal. Positioned within body 30 is a perforate retaining disc 32 which serves to retain a gas-permeable packing 33 comprising a refractory material such as unglazed porcelain chips, crushed silica, porcelain or glass beads, etc. The retaining disc 32 may be of the nature of a porous diaphragm, constructed for example of unglazed porcelain, but in order to minimize the pressure drop through the burner it is more usually constructed in the form of a screen or a plate having discrete perforations. At the end opposite the neck-portion 31, the burner body 30 is closed by a porous disc or plate 34 held in position by suitable means such as a locking ring 35. The construction of the porous disc or plate is described in further detail hereinafter.

Figure 3 illustrates an alternative form of burner comprising a tubular body member 36 having a closed end 37. Adjacent the closed end and providing entrance to the tube is a side-arm 37a which serves as an inlet conduit for the combustible gas mixture. Positioned within the body member is a conventional-type flame arrester 38 comprising a bundle of tubes of small diameter. Flame arrester 38 serves to prevent the flame from flashing back into the body of the burner. Closing off the end of the burner body 36 and shown retained thereto by means of screw threads is a cap 39 constructed of a porous refractory material and serving as the porous wall or diaphragm through which the gas mixture passes prior to combustion. Other means of retaining the porous cap 39 on the body 36 may be employed, e. g., a locking ring or lugs or even a simple force fit.

Figure 4 illustrates another alternative form which the burner may take. In this type of burner, means are provided for introducing oxygen or an oxygen-containing gas directly into the flame. As is more fully set forth hereinafter such procedure effects a considerable increase in the yield of carbon black. Accordingly, the burner comprises a tubular body member 40 with a constricted neck-portion 41 at one end serving as an inlet conduit for the combustible gas mixture. The opposite end of body member 40 is closed by means of porous disc 42 held in place by locking ring 43. A gas supply conduit 44, preferably constructed of refractory material, is mounted at the front end of the burner in such manner that gases may be passed through the conduit directly into the flame. Conduit 44 may be attached to the body member 40 by any suitable means, a bracket member 45 being shown. It is preferable that the opening in conduit 44 face the interior of the body member 40 and be positioned coaxially therewith so that the gas passing through the conduit is fed into the center of the flame and counter-directional thereto. However, if desired conduit 44 may be so positioned that gas passing therethrough is laterally fed into the flame or is co-directed with the flame. Also, if desired, the body member 40 may contain a packing or a flame arresting device as illustrated in Figures 2 and 3.

The burner may take various other forms, as will be readily perceived by those skilled in the art, it being essential, however, that it comprise a porous diaphragm or wall through which the combustible gas mixture must pass prior to its combustion. As pointed out above, such porous wall or diaphragm may take the form of a disc or plate fitted into the open-end of the burner or it may be a cap which fits over the end of the burner. It may also take the form of a cup or thimble through which the combustible mixture passes laterally as well as longitudinally. It may be made of any material sufficiently refractory to withstand the temperatures closely adjacent to the burning gas. Ordinary unglazed porcelain has been found to have satisfactory refractory properties and a suitable degree of porosity. Sintered alumina, quartz or silica, porous carbon or graphite, Alundum, sintered metal, various types of porous stone, etc. may likewise be employed. The porosity or permeability of the porous member may be varied between relatively wide limits although too high a degree of permeability results in the formation of a carbon black product lacking the desired small particle side. Conversely, a very low degree of permeability causes a relatively large pressure drop through the burner, thus increasing gas compression costs. The optimum degree of permeability is accordingly as low as is consistent with the acceptable conditions of pressure drop through the burner, which is suitably not greater than about 1 to 4 pounds. Porous diaphragms having a porosity equivalent to standard grade D, which corresponds to an average pore diameter of about 150 microns, have been found entirely suitable to the production of a carbon black product of about 10 millimicron particle size, and at the same time require a pressure differential of only about 1 pound to force the gas mixture therethrough. Diaphragms of lower porosity may be employed, however, and in general it may be stated that the average pore diameter may be from about 50 to about 200 microns.

In producing carbon black by the combustion of hydrocarbons with oxygen or an oxygen-containing gas in accordance with the invention, the oxygen is preferably employed in an amount somewhat less than that theoretically required for combustion of the hydrocarbons to carbon and water in order to minimize the formation of carbon dioxide and carbon monoxide. Use of an excess of hydrocarbon, particularly in the case of methane or natural gas, also promotes the formation of acetylene as a valuable by-product which can be recovered from the gaseous products of the combustion by suitable means, as for example countercurrent contacting with a moving bed of adsorbent carbon. Any unreacted hydrocarbon may likewise be recovered from the off-gas and recycled to the burners as shown in Figure 1, for example, by means of conduit 26. Accordingly, when employing a reactant gas mixture of methane and oxygen it is preferable that the mixture contain from about 55 to about 63 per cent by volume of methane and from about 45 to about 37 per cent by volume of oxygen. When employing natural gas and air, the equivalent proportions of methane and oxygen should be employed, suitable allowances being made for the hydrocarbons other than methane in the natural gas and for the nitrogen content of the air. Similar allowances will be made when employing hydrocarbons of higher molecular weight than methane, e. g., ethane, propane, etc. The velocity at which the gas mixture is passed through the burner may be varied between relatively wide limits, e. g., from as low as 0.5 cu. ft. per sq. cm. of porous wall area per hour to as high as 4.0 or 5.0 cu. ft. per sq. cm. per hour, depending somewhat upon the nature of the gas mixture employed.

As previously stated, we have found that important increases in the yield of carbon black from a given quantity of hydrocarbon may be secured by supplying a small quantity of oxygen or oxygen-containing gas such as air directly to the flame. This quantity is in addition to the oxygen in admixture with the hydrocarbon and usually amounts only to a small proportion, e. g., 5 to 50 per cent by volume, of the oxygen required for complete combustion of the hydrocarbon. The manner in which the additional amount of oxygen supplied to the flame serves to increase the yield of carbon black is not readily apparent. It is notable, however, that this increase in yield can not be secured by adding the additional quantity of oxygen or oxygen-containing gas to the reactant gas mixture prior to combustion; it is necessary that it be supplied directly to the flame.

While the invention has been described with particular reference to the apparatus and flow diagram illustrated in the accompanying drawings, it is to be understood that it is not limited thereto and may be practiced in a variety of ways without departing from the principle thereof, i. e., the passing of a combustible mixture comprising hydrocarbon vapor and oxygen through a porous diaphragm or wall and thereafter burning said mixture in an enclosed space to form carbon black. Thus, any of the known methods and equipment for separating finely-divided solids from gases may be employed in recovering the carbon black from the combustion product. Similarly, the closed chamber or furnace in which the combustion is effected may follow a variety of different designs and may contain few or many burners of varying size. The burners may take various forms other than those herein disclosed provided they comprise a porous wall through which the combustible gas mixture must pass prior to its combustion. Various hydrocarbon reactants may be employed, including vaporized hydrocarbons which are normally liquid as well as those which are normally gaseous. When normally liquid hydrocarbons are employed, means are of course provided for vaporizing the hydrocarbon prior to admixing it with oxygen or air to form the combustible mixture supplied to the burners. In some instances, it may be desirable to preheat the combustible gas mixture before passing it to the burners, in which case the preheating may be economically effected by passing the combustible mixture to the burners in heat exchange relationship with the hot combustion products. In many cases it will be desirable to process the gaseous combustion products for the recovery of valuable by-products, e. g., acetylene. In such instances, any of the various known vapor recovery and separation processes may be employed, e. g., countercurrent extraction with liquids or solid adsorbents, absorption, diffusion, etc.

Other modes of applying the principle of our invention may be employed instead of those explained, change being made as regards the process or apparatus herein disclosed, provided the steps stated by any of the following claims, or the equivalent of such stated steps, be employed.

We, therefore, particularly point out and distinctly claim as our invention:

1. In a process for the manufacture of carbon black, the steps which comprise forming a combustible gaseous mixture of a normally gaseous hydrocarbon and an amount of oxygen less than that required for combustion of said hydrocarbon to carbon and water, passing said mixture through a porous wall, burning said mixture in an enclosed free space while passing oxygen directly into the flame in a direction countercurrent to the burning gas mixture and in an amount representing between about 5 and about 50 per cent by volume of the amount required for the combustion of the hydrocarbon to carbon dioxide and water, and thereafter recovering carbon black from the products of the combustion, the total amount of oxygen employed being less than that required for combustion of the hydrocarbon to carbon dioxide and water.

2. The process of claim 1 wherein the combustile gaseous mixture comprises natural gas and air and the oxygen supplied to the flame is in the form of air.

3. In a process for the manufacture of carbon black, the steps which comprise forming a combustible gaseous mixture comprising a hydrocarbon vapor and an amount of oxygen less than that required for the combustion of said hydrocarbon to carbon and water, passing said mixture through a porous wall, burning said mixture in enclosed free space while passing an oxygen-containing gas directly into the flame in an amount sufficient to provide between about 5 and about 50 per cent by volume of the amount of oxygen required for the combustion of the hydrocarbon to carbon dioxide and water, and thereafter recovering carbon black from the products of the combustion, the total amount of oxygen employed being less than that required for combustion of the hydrocarbon to carbon dioxide and water.

4. The process of claim 3 wherein the combustible gas mixture comprises a normally gaseous hydrocarbon and air, and the oxygen-containing gas supplied to the flame is in the form of air.

JOHN L. BILLS.
ART C. McKINNIS.

REFERENCES CITED

The following references are of record in the file of this patent:

UNITED STATES PATENTS

| Number | Name | Date |
|---|---|---|
| 1,397,077 | Bubb | Nov. 15, 1921 |
| 1,577,481 | Messenger | Mar. 23, 1926 |
| 1,773,002 | Hunt | Aug. 12, 1930 |
| 1,823,503 | Mittasch et al. | Sept. 15, 1931 |
| 1,830,826 | Cox | Nov. 10, 1931 |
| 1,960,608 | Weber et al. | May 29, 1934 |
| 1,965,771 | Grall et al. | July 10, 1934 |
| 1,991,750 | Keeling | Feb. 19, 1935 |
| 2,254,572 | Harlow | Sept. 2, 1941 |
| 2,436,282 | Bennett | Feb. 17, 1948 |